United States Patent
Agarwal et al.

(10) Patent No.: US 10,846,311 B2
(45) Date of Patent: Nov. 24, 2020

(54) METHOD AND SYSTEM FOR EFFICIENT CLUSTERING OF COMBINED NUMERIC AND QUALITATIVE DATA RECORDS

(71) Applicants: Saurabh Agarwal, Chennai (IN); Aravindakshan Babu, Chennai (IN); Sudarshan Babu, Chicago, IL (US); Hariharan Chandrasekaran, Chennai (IN)

(72) Inventors: Saurabh Agarwal, Chennai (IN); Aravindakshan Babu, Chennai (IN); Sudarshan Babu, Chicago, IL (US); Hariharan Chandrasekaran, Chennai (IN)

(73) Assignee: Mad Street Den, Inc., Redwood City, CA (US)

( * ) Notice: Subject to any disclaimer, the term of this patent is extended or adjusted under 35 U.S.C. 154(b) by 224 days.

(21) Appl. No.: 16/155,644

(22) Filed: Oct. 9, 2018

(65) Prior Publication Data

US 2019/0130018 A1 May 2, 2019

Related U.S. Application Data

(63) Continuation-in-part of application No. 15/801,214, filed on Nov. 1, 2017.

(51) Int. Cl.
*G06F 16/28* (2019.01)
*G06F 17/17* (2006.01)
*G06N 7/08* (2006.01)
*G06F 16/242* (2019.01)
*G06K 9/00* (2006.01)
*G06K 9/62* (2006.01)

(52) U.S. Cl.
CPC ........ *G06F 16/285* (2019.01); *G06F 16/2425* (2019.01); *G06F 17/17* (2013.01); *G06K 9/00986* (2013.01); *G06K 9/6218* (2013.01); *G06N 7/08* (2013.01)

(58) Field of Classification Search
CPC .... G06F 16/285; G06F 16/2425; G06F 17/17; G06K 9/00986; G06K 9/6218; G06N 7/08
See application file for complete search history.

(56) References Cited

U.S. PATENT DOCUMENTS

| | | | |
|---|---|---|---|
| 2005/0222972 A1* | 10/2005 | Mishra | G06F 16/355 |
| 2007/0255737 A1* | 11/2007 | Chakrabarti | G06K 9/6218 |
| 2013/0226922 A1* | 8/2013 | Labenski | G06F 16/35 |
| | | | 707/737 |
| 2015/0302042 A1* | 10/2015 | Shirai | G06F 16/2365 |
| | | | 707/690 |

(Continued)

*Primary Examiner* — Hares Jami
(74) *Attorney, Agent, or Firm* — Mersenne Law (57) ABSTRACT

An optimized and efficient method of identifying one or more points within a dataset that are close to the centers of clumps similar records in a large, multi-element dataset uses Monte Carlo techniques to compute approximate clustering costs at significantly reduced computational expense. The inaccuracy caused by the approximate methods is also estimated, and if it is too high, the method may be repeated with a larger Monte Carlo sample size to improve accuracy. Portions of the algorithm that are independent are distributed among a number of cooperating computing nodes so that the full algorithm can be completed in less time.

11 Claims, 7 Drawing Sheets

(56) References Cited

U.S. PATENT DOCUMENTS

2015/0356163 A1\* 12/2015 Matteson .............. G06F 16/285
                                                707/738
2017/0264493 A1\*  9/2017 Cencini .................... G06F 1/26
2018/0276861 A1\*  9/2018 Wright ................... G06N 3/084

\* cited by examiner

METHOD AND SYSTEM FOR EFFICIENT CLUSTERING OF COMBINED NUMERIC AND QUALITATIVE DATA RECORDS

CONTINUITY AND CLAIM OF PRIORITY

This U.S. patent application is a continuation in part under 35 U.S.C. § 120 of U.S. patent application Ser. No. 15/801,214 filed 1 Nov. 2017, the disclosure of which is incorporated by reference in its entirety.

FIELD

The invention relates to computational techniques for processing numerous heterogenous data records. More specifically, the invention relates to efficient methods for evaluating large datasets by finding the medoids of clusters of similar records using multiple cooperating computing devices.

BACKGROUND

Figure 6:
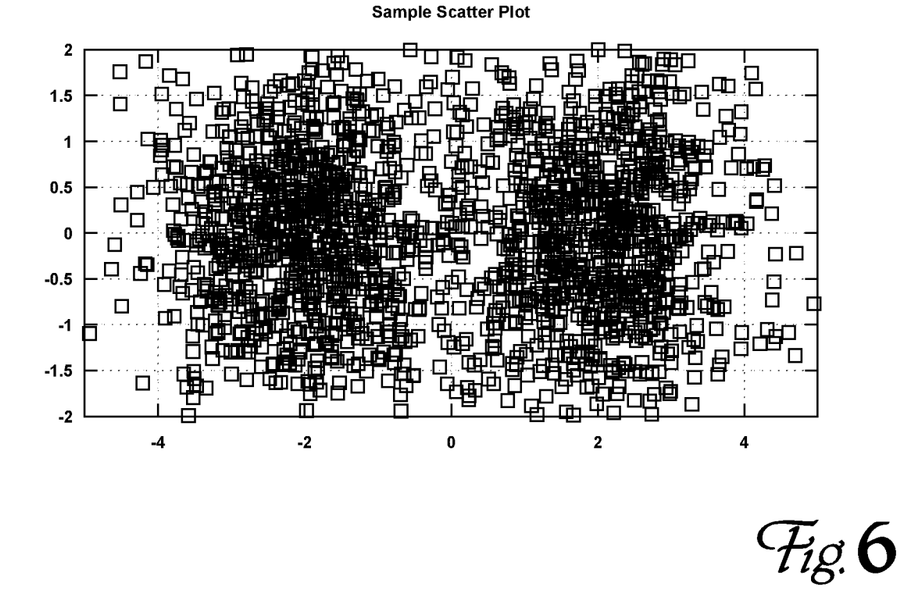
FIG. 6 is an example scatter chart that can be evaluated by inspection.

A variety of graphical representations have been developed to communicate the information in a dataset more effectively to an audience. For example, a pie chart can be used to show at a glance the relative proportions of several ingredients or sub-quantities that make up a whole, and a bar chart can show the development of a metric over discrete periods of time. A scatter chart can convey information about a plurality of observations of a pair of numeric quantities: the observations are plotted on a rectilinear graph, and the viewer can apprehend characteristics of the observations that would be harder to understand from simply examining a table of numbers. For example, FIG. 6 shows a simple scatter plot of 1,000 random X,Y pairs of numbers drawn from Gaussian distributions having means at (2,0) and (−2,0) (standard deviation=1). The centers of the two sets of numbers can be identified by inspection: the two higher-density clumps of the scatter plot appear to be centered around (−2,0) and (2,0).

Figure 7:
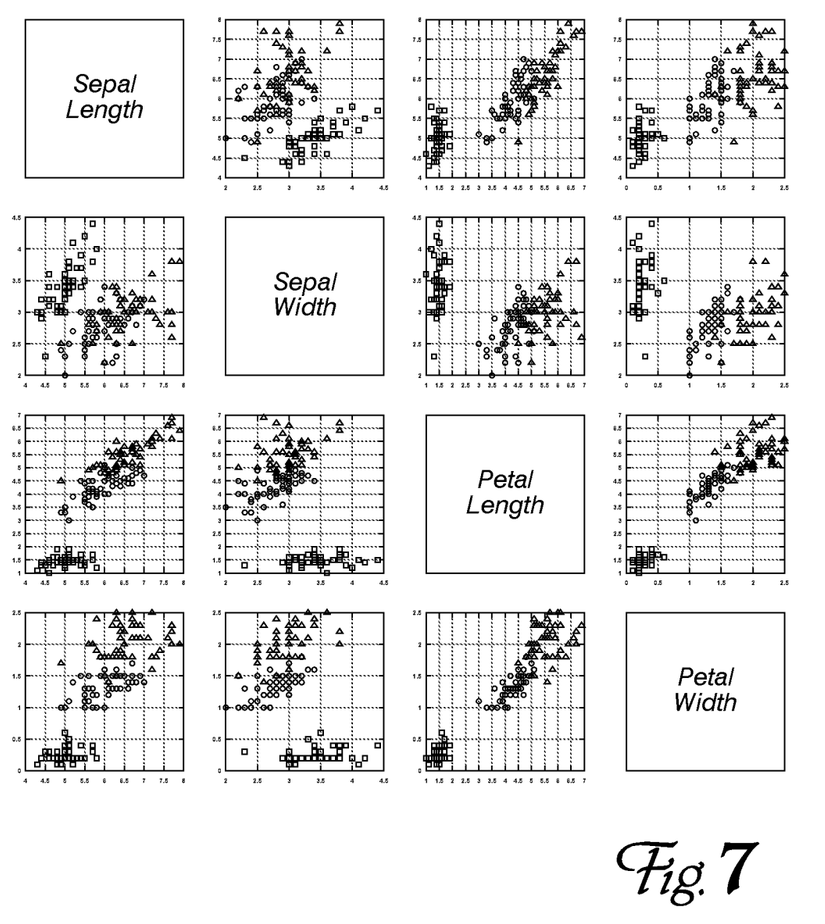
FIG. 7 shows a set of scatter charts prepared from a well-known, multi-element dataset.

When more than two quantities need to be represented on a scatter chart, they may be shown as different symbols or different colors on a two-dimensional plot, or as points in a three-dimensional volume, displayed by a sophisticated apparatus or mapped to a two-dimensional image through conventional computer-graphics processing. However, a direct-view representation of large numbers of records, comprising more than four or five quantities each, is cumbersome and impractical. For example, a multivariate data set collected by British statistician and biologist Ronald Fisher and published in his 1936 paper *The use of multiple measurements in taxonomic problems*, is often used to illustrate (and test) statistical data analyses. The data set consists of 50 samples from each of three species of *Iris* (*Iris setosa, Iris virginica* and *Iris versicolor*); each sample comprises measurements of the length and the width of the sepals and petals of the specimen, plus its species. A few example records are reproduced here, and the two-dimensional scatter plots of FIG. 7 show each measurement in relation to the others, with the species represented by different symbols in the plot.

| Sepal Length | Sepal Width | Petal Length | Petal Width | Species |
|---|---|---|---|---|
| 5.1 | 3.5 | 1.4 | 0.2 | Iris-setosa |
| 4.9 | 3.0 | 1.4 | 0.2 | Iris-setosa |
| 7.0 | 3.2 | 4.7 | 1.4 | Iris-versicolor |
| 6.4 | 3.2 | 4.5 | 1.5 | Iris-versicolor |
| 6.3 | 3.3 | 6.0 | 2.5 | Iris-virginica |
| 5.8 | 2.7 | 5.1 | 1.9 | Iris-virginica |

One of the species can be distinguished by inspection of many of the plots, but visually distinguishing all three species is virtually impossible. Nevertheless, a variety of statistical techniques (including embodiments of the invention described below) make quick work of this task—but only because the total number of data records is small.

The purpose served by a scatter graph—to highlight groups of similar or related observations and identify a "center" or "medoid" point for each group—is an important approach to understand and use data sets containing extremely large numbers of records, each with many associated measurements, quantities or qualities. In particular, the ability to identify groups or clusters within observations that include both quantitative (numeric, often continuous) elements and qualitative (discrete) elements, is of substantial value in many fields. Unfortunately, popular techniques for emulating what a human accomplishes easily by looking at a two-dimensional scatter chart, are computationally expensive when performed on large (e.g., millions of records) datasets containing many characteristics per record. For example, the standard K-Medoids algorithm is an important and popularly-practiced clustering technique for mixed data. The basic and highest-quality K-Medoids routine is Partitioning Around Medoids, or "PAM." PAM is an iterative algorithm, iteratively seeking to improve the clustering quality. Unfortunately, it is computationally expensive. The cost of PAM is quadratic in the number of observations, a rate of growth that makes it infeasible for modern data set sizes. Existing PAM variants such as CLARA, CLARANS and pivot-based K-Medoids also suffer from various drawbacks. For example, CLARA can result in poor-quality clusters. Under the ubiquitous situation of constant number of iterations, CLARANS is also of quadratic cost. Further, CLARANS does not provide any formal or mathematical guarantees on the per-iteration quality vis-a-vis PAM. Pivoted K-Medoids only works for Euclidean metrics.

Approaches that reduce the computational complexity of clustering mixed data while offering theoretical guarantees on the quality of the results may be of substantial value in many fields.

SUMMARY

Embodiments of the invention efficiently identify clusters of similar records within large datasets containing records having a combination of quantitative or numeric elements and qualitative or discrete elements in each record. The techniques require fewer computational resources than prior-art K-medoid methods, especially fewer data transmission resources, and provide theoretical quality guarantees. These techniques allow the clustering work to be divided among a plurality of possibly-heterogenous computing nodes with good scalability characteristics, so that the problem can be solved as quickly as desired by setting additional computing nodes to work in parallel. Thus, the techniques improve the operation of a parallel computing network on the specific task of finding medoids of large datasets having a plurality of clusters of similar records.

The improvements described here are virtually linear—doubling the number of computing nodes practically doubles the speed of computation; there is very little overhead to sap the performance increases. Thus, embodiments of the invention allow the analysis to scale with dataset size. Even when the dataset size becomes huge and cannot be loaded into the memory of one machine, this method is effective and reliable. Further, it allows the practical application of more modest analysis machines (it is much easier to obtain ten, 8 GB RAM machines, than one, 80 GB RAM machine).

Practical applications for the clustered records are also described and claimed.

DETAILED DESCRIPTION

The inventors' first patent application describing and claiming the Monte Carlo K-Medoid Clustering method explained the mathematical foundations for the accuracy guarantees of their data analysis method. In the present application, they set forth a method of dividing the work among a plurality of cooperating computing nodes so that the analysis can be completed quickly and efficiently. This method improves the functioning of a distributed computing network comprising a master node and a plurality of slave nodes, allowing the cooperating computers to calculate a result even though the original method was not a parallel algorithm.

Embodiments of the invention apply the well-known statistical tool Monte Carlo Analysis to the specific task of finding clusters of related or similar records within a large dataset containing many multi-valued data points. The problem of "finding clusters within a dataset" may be more precisely stated as the problem of finding representative points or "medoids" within the dataset such that the overall clustering cost is at a minimum, where the clustering cost is the sum of the distances from each point to its nearest medoid.

Figure 5:
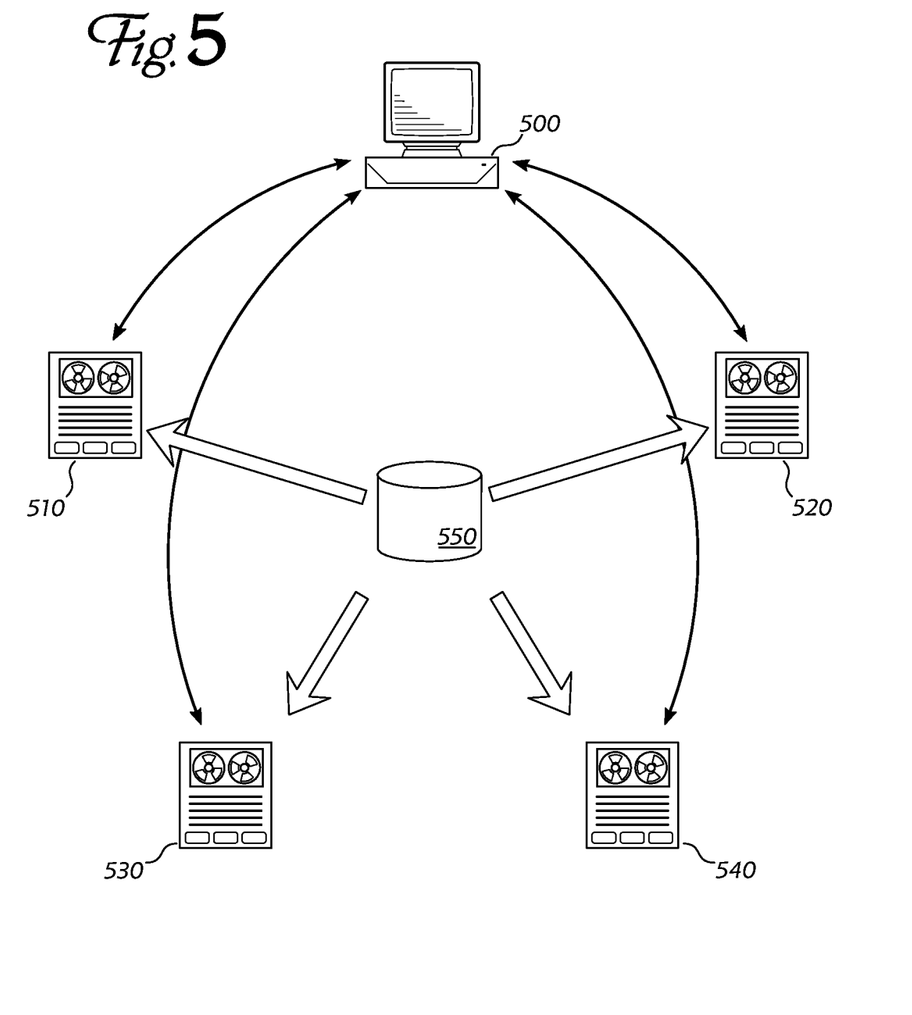
FIG. 5 shows a sample network environment where the inventive method can be carried out.

FIG. 5 shows a sample network topology comprising multiple nodes that can cooperate to perform the method described herein. A master node 500 coordinates the activities of the slave nodes (510, 520, 530, 540) and collates their results. Each slave node requires access to only a portion of the full dataset (shown as 550). In some environments, only the master may have access to the full dataset; in those situations, the master may send each slave the portion of the database that the slave needs to use. In other embodiments, each slave may be able to access the full dataset, but it only does access the portion it needs. In either case, all the slaves together access the full dataset once (i.e., it is not necessary to send the full dataset to each slave). Thus, the transmission costs of sending the dataset to the slaves is proportional to the size of the dataset, and not the size of the dataset multiplied by the number of slaves. (Dataset transmission represents the lion's share of the communication overhead of the procedure described here.) In addition, note that although the master has access to the full dataset, it does not need to examine or operate on every record therein. Instead, the master only needs to choose a (very small) subset of records, randomly, from the full dataset. Therefore, the master's communication needs are also modest, and it only needs enough memory to hold the small record subset.

The slave machines need not be identical, or even of similar capability. The master may assign larger portions of the work to more-capable slaves, and smaller portions to less-capable slaves. However, for simplicity of description, we will assume that all the slaves are equivalent, and that they each perform about the same amount of work during the computation. Further, we will assume that there are c slaves, and that each slave works with a portion 1/c of the full data set.

Figure 1:
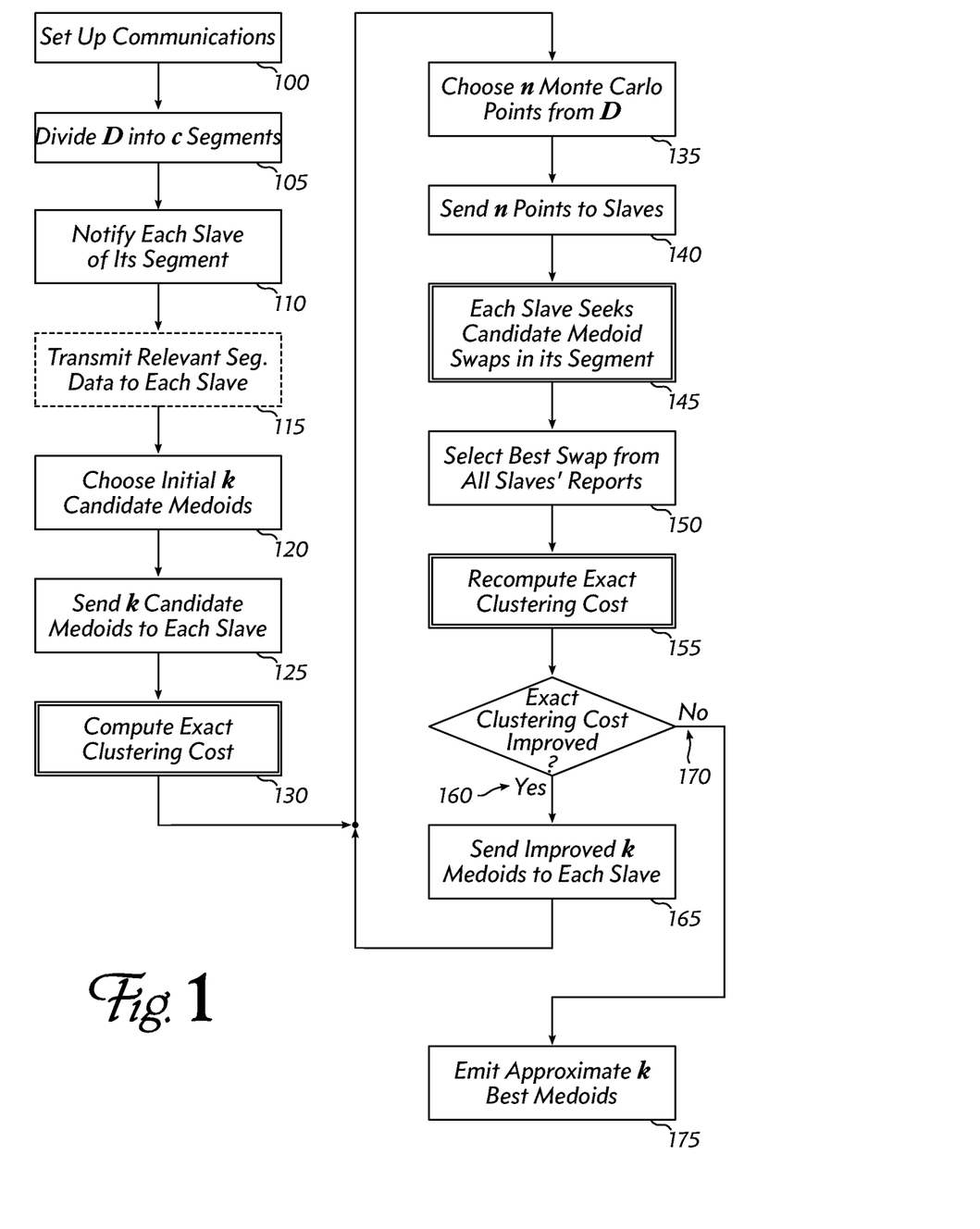
FIG. 1 outlines a data-analysis method according to an embodiment.

FIG. 1 is a flow chart outlining the operations of a basic embodiment. The master node must establish communications with all of the slaves (100), although it may do so with direct connections or by relying on slaves to pass messages through multiple hops. The full dataset D is divided into c segments, where c is the number of slaves (105). As noted previously, the segments need not be of equal size, but for simplicity of description, they will be assumed to be equal here.

Each slave is notified of its portion of the dataset (110), and if the slaves do not have access to their portion of the full dataset, then each slave's portion of the dataset is sent to it (115). The master also chooses an initial $k$ candidate medoids from the full dataset (120). $k$ is much smaller than |D|, especially when |D| is on the order of millions or more. The initial $k$ candidate medoids may be chosen at random (without replacement), or chosen by a prior-art medoid estimating technique. The initial $k$ candidate medoids are transmitted to each slave (125). The communication costs for sending the candidate medoids are negligible. Since the initial $k$ candidates are chosen from D, some of the candidates will not be members of some of the slaves' segments.

Figure 2:
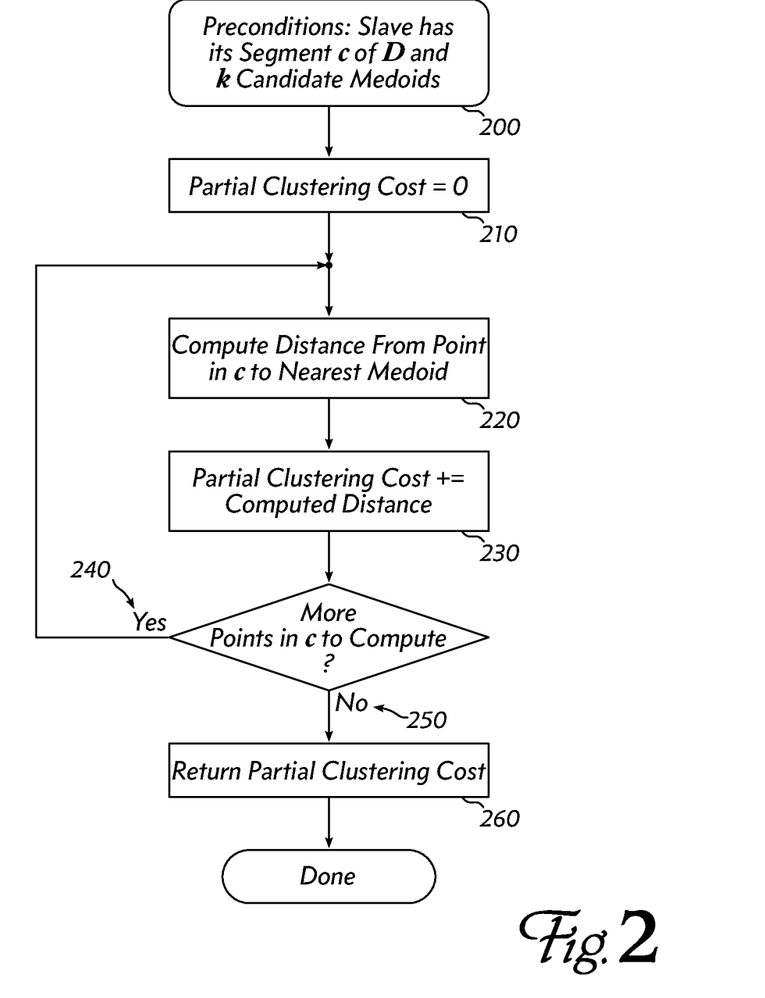
FIGS. 2 and 3 show details of the overall method that are performed in parallel by cooperating computing nodes.

Next, the system computes the exact clustering cost for the first $k$ candidate medoids (130) using the sub-method outlined in FIG. 2. On entry to this sub-method, each slave has its segment c of D and the current $k$ candidate medoids (200). Each slave initializes a partial clustering cost accumulator to zero (210) and then computes the distance from a point in its (the slave's) c to the nearest of the $k$ candidate medoids (220). This distance is added to the partial clustering cost accumulator (230). If there are more points in c (240), the sub-method repeats for the next such point. Otherwise (250), the slave returns the partial clustering cost to the master (260) for use there. The master adds all the partial clustering costs it receives from the slaves to determine the total, exact clustering cost for the $k$ candidate medoids (130).

Now the master chooses $n$ "Monte Carlo" points at random (with replacement) from the full dataset D (135) and sends them to each slave (140). Note that $n$ is much smaller than |D|; typically, $n$ will be on the order of $10^3$ or $10^4$. Therefore, the communication cost of these transmissions is also negligible (compared to the millions or billions of data points in the datasets for which this invention is best suited). These $n$ Monte Carlo points will be used to compute the approximate clustering cost estimate (using Monte Carlo principles) at each slave. Since the points are chosen from the full dataset, some of the points in $n$ may not be present in some of the slaves' segments of D.

Each slave seeks favorable candidate medoid swaps with the data points in the slave's segment c of the full dataset D (145). This process is outlined in FIG. 3. Upon entry to this sub-method, each slave has its segment c of the full dataset D, a set of $k$ candidate medoids from the master, and the $n$ Monte Carlo points chosen randomly by the master (300). Doubly-nested loops 301 and 302 begin: outer loop 301 iterates over the $k$ candidate medoids, and inner loop 302 iterates over the c data points of the slave's segment of D.

Figure 3:
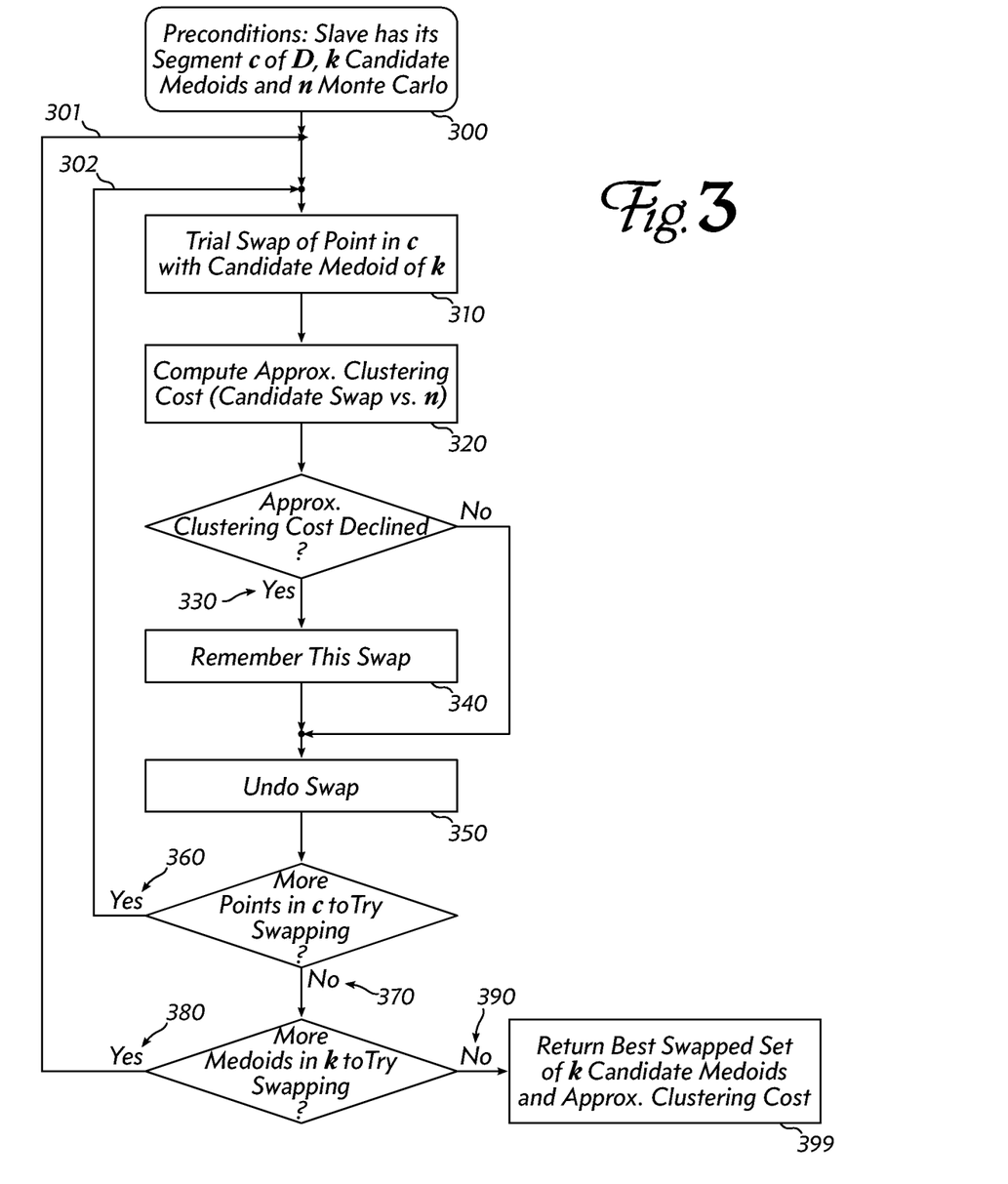

The slave performs a "trial swap" of a point in c for a candidate medoid in $k$ (300). Then, the approximate clustering cost is computed, as the sum of the distances from each point in $n$ to the nearest of the current candidate medoids (with one medoid swapped) (320). If this approximate clustering cost has declined from the value computed in earlier iterations, the current swap is remembered as the best swap encountered so far (340). The swap is undone (350), and if there are more points in c to try (360), the inner loop continues. If all of the points in c have been tested at the current position in the $k$ candidate medoids (370), then the method moves on to the next of the $k$ candidate medoids (380). Once all points in c have been tried at each of the $k$ candidate spots, the best swap encountered is returned to the master, along with the approximate clustering cost of that swap (399).

Note that the sub-method described in FIG. 3 only processes a portion of D (the slave's portion c), and that it does not calculate the exact clustering cost, but rather the approximate clustering cost based on the distance between a set of $k$ candidate medoids and the $n$ randomly-chosen Monte Carlo points. Embodiments of the invention thus achieve two speed-ups: by testing swaps of only a portion of D, and by evaluating the swaps using only $n$ Monte Carlo points, each slave can complete its work faster. Each slave's work is independent of the others, so it can be parallelized efficiently, and the speed-up available from adding additional slaves is nearly linear.

Returning to FIG. 1, the master selects the best swap from among all the slaves' reports (150). This is the set of $k$ candidate medoids where some or all of the candidates have been swapped with data points from a slave's subset c to achieve the lowest approximate clustering cost. Next, the exact clustering cost of this best swap is computed (155), again, using the sub-method of FIG. 2. If the exact clustering cost has declined (160), then the improved set of $k$ medoids is transmitted to each slave (165), a new set of $n$ Monte Carlo points are chosen (135) and sent to the slaves (140), and they repeat the best-swap search process (145).

If the exact clustering cost has not declined (170), then the method has converged on a good approximation of the $k$ best medoids to represent clusters in D. These are returned to the user (175).

The method described in FIG. 1 (with sub-methods of FIGS. 2 and 3) glosses over a subtle operation of the master at 160/170, the determination whether the slaves' "best swap" has improved the situation, and what to do about it.

Figure 4:
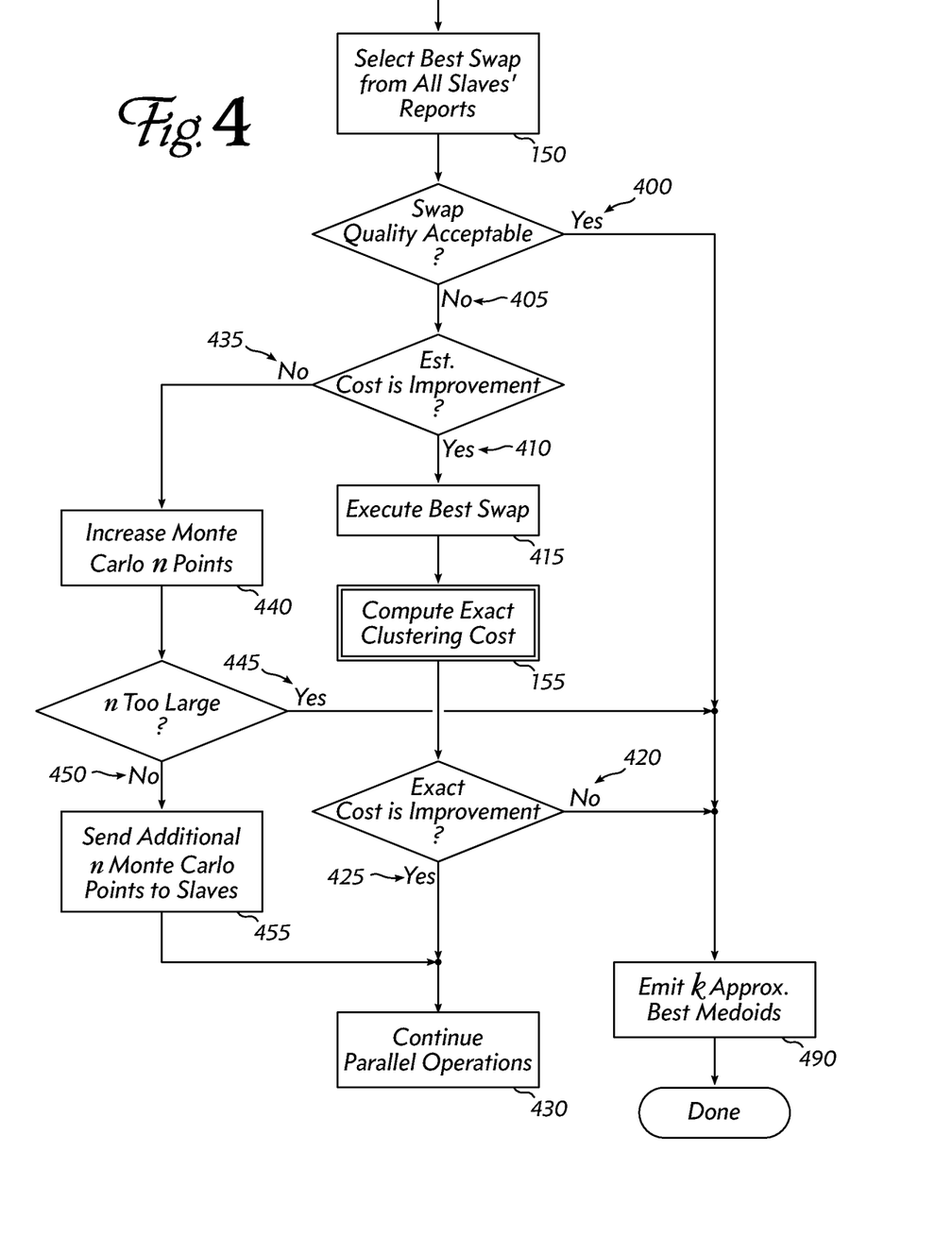
FIG. 4 presents additional details of a significant step of the method of FIG. 1.

Turning to FIG. 4, we explain the operation in greater detail. As before, the master selects the best swap from among the slaves' reports (150). But before returning the candidate medoids or proceeding with the swapped medoids, the master uses additional information about the best swap that the slaves can provide because of the Monte Carlo operations. Specifically, the master can consider the quality of the swap: how "noisy" is the estimate, and what is the expected further possible improvement from further search. If the quality is acceptable (400) then the best swapped medoids may be emitted as the result of the process (490). "Acceptable" may mean, for example, that the noise estimate is less than a predetermined value such as 5%; and the expected improvement in clustering cost is also low (for example, also 5%).

For purposes of embodiments of the invention, "swap quality" indirectly indicates whether a good solution to the clustering problem has already been found. For example, if the estimate of the current swap is not very noisy and the expected improvement by executing the swap is not much (e.g., less than 5%) then we already have a good solution, and not much expected gain from continued computation.

If the swap quality is not yet good enough (405)—we don't yet have a good solution to the clustering problem—then the estimated clustering cost of the best swap, inflated to account for its noisiness, is compared to the current exact clustering cost. If it is better than the current candidate medoids' exact cost (410), then the swap is "executed" (415) by sending the improved $k$ candidate medoids to all of the slaves. The slaves compute the exact clustering cost (as previously described, 155) and the master decides whether the estimated best swap has actually improved the clustering cost. If not (420), then the current candidate medoids are probably the best, and are returned as such (490).

If the exact clustering cost (155) has improved the situation (425), then parallel operations continue (430) with the slaves searching for the best swaps for the new $k$ candidates among each slave's subset c of D (FIG. 3).

If the swap quality was not acceptable (405) and the estimated clustering cost was also not an improvement (435), then the algorithm may have encountered difficulty converging, possibly due to using an insufficient number of Monte Carlo points $n$ from D. Thus, $n$ is increased (440)—for example, the algorithm may increase $n$ by a fixed factor such as 5 or 10, or by a factor that is proportional to the quality of the most recent estimate (it is appreciated that, generally speaking, increasing the number of points increases the quality of a Monte Carlo estimate).

If $n$ is "too large," (445) (e.g., if it exceeds a predetermined fixed number that may be related to the computing resources available among the slaves, or if it exceeds a predetermined fraction of the total dataset size) then the algorithm may give up and return the $k$ best medoids currently known. If the "too large" threshold has not yet been reached (450), then an additional number of points are chosen randomly from D and sent to the slaves for use in their further operations, which continue (430).

Taking a slightly less formal view of the operations of an embodiment, we see that the method allows a group of cooperating computers to make a "very good" or "high quality" estimate of the medoids of a very large data set. The method is not guaranteed to find the exact best medoids, as an exhaustive search might be able to do, but its Monte Carlo approximation comes with a guarantee on the near-optimality of the improvement in the clustering cost at each iteration while being much faster than an exhaustive search, and its work can be divided among as many modest machines as desired, rather than requiring a single high-performance machine with vast computational and storage resources. Thus, it is of great practical value because of its speed and effective use of distributed resources. In the inventors' experiments, the algorithm performs nearly as well as the highest-quality prior-art method known, PAM ("Partitioning Around Medoids"), yet requires only a fraction of PAM's resources.

The master computer generally coordinates that activities of an embodiment by assigning work to the slave computers and then receiving and collating their results. The slaves do most of the actual computation, so it is preferred that the most-capable computers available serve as slaves. Computer capability may be judged by processor count (in a multi-processor machine), processor speed, and by amount of high-speed random-access storage (e.g., RAM) available. Slaves need not all be identical, and the master can assign varying workloads according to varying capability of heterogenous slaves. The master computer's capability is not critical; it does not need to be as fast as the slaves, nor to have as much available RAM.

One aspect of the operation of an embodiment may only become apparent after some focused consideration of the methods described above. Each slave works mainly on just a portion of the full dataset, so it is not immediately clear how an embodiment could find the best approximate medoids if these medoids are part of different slaves' portions of the dataset. The answer has two parts. First, when each slave is evaluating swaps to find an improvement over the current best set of candidate medoids, it is testing points in its own portion of the dataset against $n$ Monte Carlo points drawn randomly from the whole dataset—not just against points drawn from its portion. Therefore, it is possible that a slave will not have a point in its portion that can improve the clustering cost for one of the $k$ candidate medoids, and will leave that medoid unswapped.

Second, the master makes its decisions based in part on the exact clustering cost, which reflects the distance from a set of candidate medoids to all of the dataset points. The algorithm operates to let each slave find the best medoids that are within its own portion of the dataset, while leaving other candidate medoids alone. The master's operations allow the best medoids from each slave to accumulate in the candidate medoid list, until the candidate medoids become "good enough" that further search is unlikely to produce further significant improvement.

Suppose, for example, that a dataset is divided evenly between two slaves, and further that an exact determination of best medoids would locate two—one in each of the slaves' portions. The master's initial candidate medoids may be in either portion of the database; the two slaves' first-round "best swap" estimate should find one of the exact (or approximately exact) best medoids. (Each slave should find the best medoid that exists in its own portion of the dataset, and may find some improvement over the master's initial choice for the other one.)

One of the slaves' best-swap estimates will be superior to the other's, so the master will choose that one for the next iteration (i.e., the candidate medoids will have one of the correct medoids, and one that is sub-optimal). In the next iteration, the other slave will find a better swap for the incorrect medoid, but not for the approximately-correct one. Its "best swap" answer will contain both correct (or approximately correct) medoids, and the master will see that further improvement is unlikely, so both of the approximately-best medoids will be returned. Thus, it is a characteristic of embodiments of the invention that improved medoids accumulate in the list of candidate medoids maintained by the master computing node.

An embodiment of the invention may be a machine-readable medium, including without limitation a non-transient machine-readable medium, having stored thereon data and instructions to cause a programmable processor (or a group of programmable processors communicating among themselves over a distributed data communication network, cooperating to accomplish a task) to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that identification of approximately optimal medoids of a large and heterogeneous dataset can also be achieved by software and hardware that distribute the functions of embodiments of this invention differently than herein described. Such variations and implementations are understood to be captured according to the following claims.

We claim:

1. A method for improving the performance of a group of cooperating computers working together to find approximately-optimal cluster medoids for a dataset of a plurality of multi-element records, the method performed by a master computer and a plurality of slave computers, comprising:
   assigning a segment of a dataset to each slave computer of the plurality of slave computers;
   choosing an initial set of candidate medoids from the dataset to serve as a current candidate medoid set;
   choosing a Monte Carlo subset of records of the dataset and sending the Monte Carlo subset of records to each of the plurality of slave computer; and
   iteratively improving the current candidate medoid set based on interim results from the plurality of slave computers to obtain an acceptable-quality candidate medoid set, wherein each slave:
   receives the current candidate medoid set;
   computes a exact clustering cost as a sum of a distance between each record of the slave's segment of the dataset and a nearest candidate medoid of the current candidate medoid set;
   computes an approximate clustering cost as a sum of a distance between each record of the Monte Carlo subset of records and the nearest candidate medoid of the current candidate medoid set;
   identifies a slave-best medoid swap from among data records of the slave's segment of the dataset, and
   transmits the slave-best medoid swap to the master computer.

2. The method of claim 1, further comprising:
   choosing a best medoid swap from among the plurality of slave-best medoid swaps received from each slave computer of the plurality of slave computers;
   replacing the current candidate medoid set with the best medoid swap to produce a next candidate medoid set; and
   performing another iteration of the iteratively improving operation using the next candidate medoid set.

3. The method of claim 2, wherein each slave-best medoid swap comprises swap-quality information, the method further comprising:
   evaluating the swap-quality information to determine whether the method has converged; and
   if the method has converged, emitting the current candidate medoid set as an approximate best candidate medoid set for the dataset.

4. The method of claim 3 wherein the swap-quality information includes an estimate of a noise in the slave-best medoid swap.

5. The method of claim 3 wherein the swap-quality information includes an estimate of an expected potential improvement in the slave-best medoid swap.

6. A non-transitory tangible computer-readable medium containing data and instructions to cause a master computer and a plurality of cooperating slave computers to perform operations comprising:
   establishing communications between the master computer and the plurality of cooperating slave computers;
   dividing a dataset comprising a plurality of multi-element records among the plurality of cooperating slave computers, each slave computer thus having a portion of the dataset;
   selecting k initial candidate medoids from the dataset and sending the k initial candidate medoids to the cooperating slave computers; wherein k is a positive integer;
   selecting n random Monte Carlo multi-element records from the dataset and sending the n records to the cooperating slave computers; wherein n is a positive integer;
   receiving a plurality of partial clustering costs from the cooperating slave computers, each said partial clustering cost computed by a cooperating slave computer as a sum of distances from the slave's portion of the dataset to a nearest candidate medoid of the k initial candidate medoids;
   summing the plurality of partial clustering costs to obtain an exact clustering cost of the k initial candidate medoids;
   accepting a plurality of slave-best medoid swaps from the plurality of cooperating slave computers;
   selecting a best swap from among the slave-best medoid swaps; and
   repeating the receiving, summing, accepting and selecting operations to identify an improved set of medoids for the dataset.

7. The tangible computer-readable medium of claim 6, containing additional data and instructions to cause the master computer and plurality of cooperating slave computers to perform further operations comprising:
   evaluating a quality of the best swap; and
   if the quality of the best swap exceeds a predetermined level, discontinuing the repeating operation.

8. The tangible computer-readable medium of claim 6 wherein each slave computer has an equal-sized portion of the dataset.

9. The tangible computer-readable medium of claim 6 wherein at least one slave computer has a different-sized portion of the dataset from at least one other slave computer.

10. The tangible computer-readable medium of claim 6 wherein at least one of the $n$ random Monte Carlo multi-element records is not part of the dataset portion of at least one of the slave computers.

11. The tangible computer-readable medium of claim 6 wherein at least one of the $k$ initial candidate medoids is not part of the dataset portion of at least one of the slave computers.

* * * * *